Jan. 28, 1969 G. MAXON, JR 3,424,498
DUMP TRUCK BODY
Filed Dec. 5, 1966 Sheet 1 of 3

INVENTOR
Glenway Maxon, Jr.

United States Patent Office 3,424,498
Patented Jan. 28, 1969

3,424,498
DUMP TRUCK BODY
Glenway Maxon, Jr., 1744 N. Farwell Ave.,
Milwaukee, Wis. 53202
Filed Dec. 5, 1966, Ser. No. 599,155
U.S. Cl. 298—7    11 Claims
Int. Cl. B60p 1/16; B65g 67/24

ABSTRACT OF THE DISCLOSURE

An open top high discharge tilt body having a width and height substantially equal to its length. The side and bottom edges of a rear discharge opening located below a rear wall on the body are defined by the rear of an upwardly and rearwardly convergent trough-like bottom wall which bellies downwardly between a pair of opposite longitudinal reinforcing rails on its sides so as to be in tension under the weight of the body contents. Lugs on the rails receive the thrust of lift cylinders by which the body is tilted to discharge its contents.

---

The body of this invention is of the open top tilting discharge type, and it has several features in common with that disclosed in my Patent No. 2,880,977, issued Apr. 7, 1959, and entitled Dump Truck for Concrete and other Semi-liquid Materials. However, it differs from that of my aforesaid patent in several important respects.

The body of my above mentioned patent was made quite long to achieve high capacity, and it was heavily reinforced along its bottom wall by a rigid network of beams sometimes referred to as a keel structure, to which the thrust of hydraulic lift cylinders was applied to effect tilting discharge of the body contents.

In contrast, it is the purpose of this invention to provide a dump truck body which is constructed in a way that obviates the aforesaid rigid keel structure and achieves a substantial reduction in weight and overall length without a corresponding decrease in body capacity.

In this respect, it is one of the objects of the invention to provide a dump body which is short enough to nicely adapt it for mounting on a truck chassis with the body positioned either lengthwise or transversely of the chassis, for so called rear or side discharge of its contents.

These objectives are achieved in a dump body which is so proportioned that in terms of overall dimensions, its height and width are substantially equal to its length, so that the body has a particularly desirable weight saving shape.

More specifically, it is a purpose of this invention to provide a light weight dump body of the character described which features a trough-like bottom wall that converges upwardly and rearwardly over the body tilt axis to define the side and bottom edges of a rearwardly facing discharge opening, and wherein a pair of longitudinal reinforcing rails on opposite sides of the body enable it to easily bear the forces imposed upon its walls by the weight of the body contents and by the thrust of hydraulic tilt cylinders upon portions of the reinforcing rails.

With the above and other objects in view which will appear as the description proceeds, this invention resides in the novel construction, combination and arrangement of parts substantially as hereinafter described.

The accompanying drawings illustrate one complete example of the physical embodiment of the invention, constructed according to the best mode so far devised for the practical application of the principles thereof, and in which.

Figure 1:
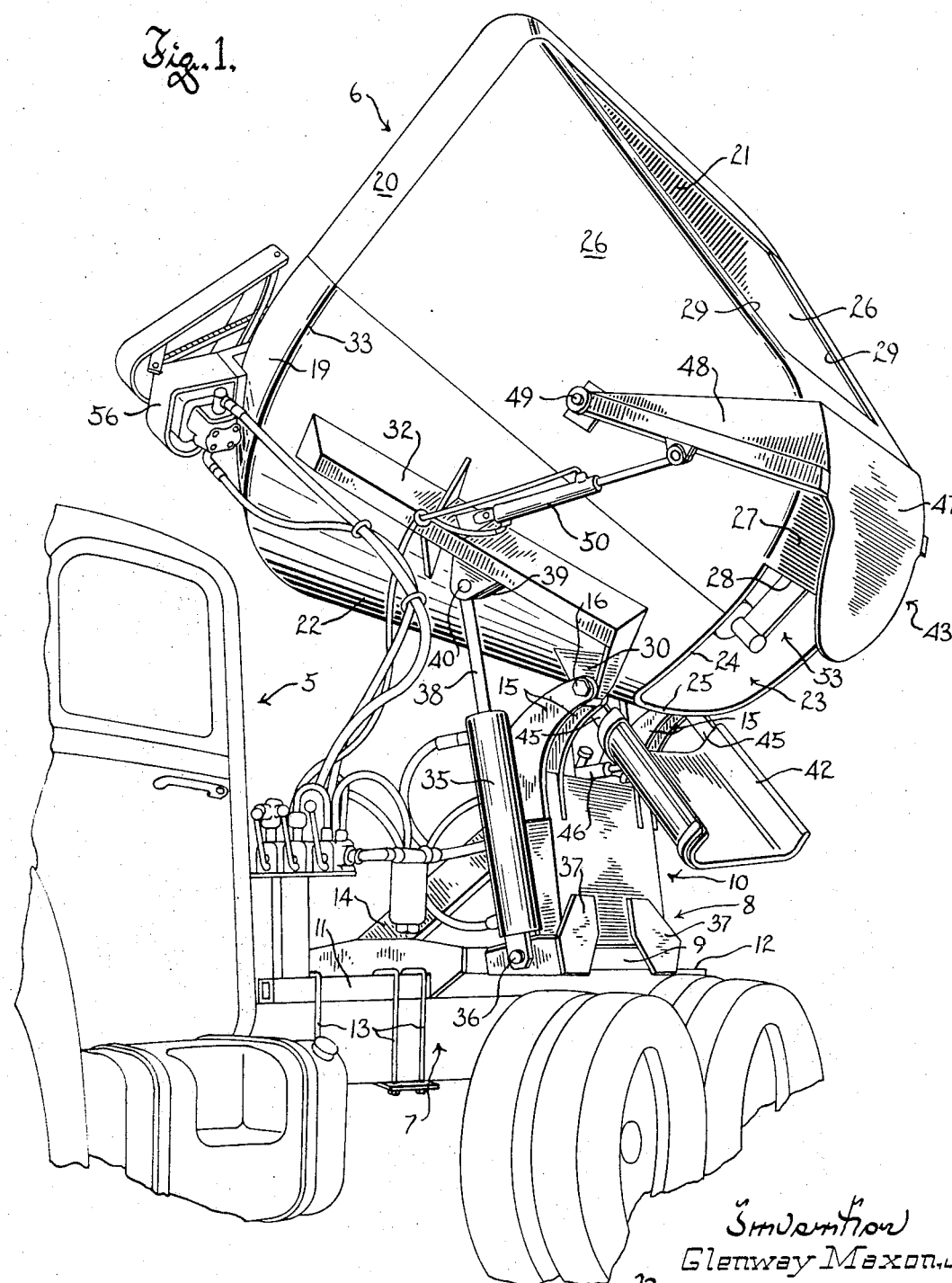
FIGURE 1 is a perspective view of part of a truck showing the dump body of this invention mounted thereon to discharge its contents to one side of the truck.

Referring now to the accompanying drawings, the numeral 5 designates a truck having the dump body 6 of this invention mounted crosswise on the longitudinally extending beams 7 of its chassis, by means of a subframe 8. The subframe is a substantially lightweight weldment fabricated mainly from tubular members of square and/or rectangular shape. It has a substantially small horizontal base 9 consisting of four such tubular members welded together and forming a square of a size to span and seat upon the chassis beams 7 with an upright outwardly offset standard 10 on the subframe disposed either at the rear of the chassis or at one side thereof, as shown.

Tubular outriggers 11 and 12 are welded to opposite sides of the base 9 in line with whichever of its tubular members are to be supported lengthwise upon the frame beams 7. The outriggers thus also rest lengthwise upon the chassis beams 7, and they are secured thereto in any suitable manner, as by U-bolts 13 such as shown, so as to firmly anchor the subframe onto the truck chassis.

The upright standard 10 has a width no greater than that of the base 9, and it is carried by the subframe in a position offset a distance to one side of its base and rises a substantial distance thereabove. Its upper portion is welded to opposite braces 14 which angle downwardly to the base to have their lower ends fixed thereto. Pairs of arms 15 welded to opposite sides of each brace at their upper ends extend upwardly and outwardly therefrom beyond the standard, and carry the pivot pins 16 by which the body is supported for tilting motion on the subframe. The pins 16, of course, are aligned on a common horizontal axis which extends transversely of the braces 14.

The dump body 6 of this invention is open at its top and has a substantially narrow rear end portion which extends over the top of the standard 10 to be mounted on the pivot pins 16 thereof. The pins thus provide for upward tilting motion of the wider front portion of the body out of a normal transit position cradled in cleats 18 on the base 9 at the side of the subframe remote from the standard.

The body is deepest at its wider front portion, which comprises a substantially conically surfaced bottom wall portion 19 of short axial length and semicircular cross section, and which converges forwardly, a pair of upright substantially flat side wall panels 20 which are joined by the bottom wall portion 19 and similarly converge in the forward direction, and a front wall 21 which closes the front of the body. The axis of the conically surfaced bottom wall portion is slanted upwardly and rearwardly, and the front wall 21 is disposed normal to said axis.

The main portion of the body extends rearwardly from its wide front portion, and comprises a trough-like bottom wall 22 of semicircular cross section that converges uniformly upwardly and rearwardly over the tilt axis of the pivot pins 16 to terminate slightly beyond the pins. The trough-like bottom wall thus also has a conical surface, and the conically surfaced bottom walls have a common axis. This axis slants upwardly and rearwardly and passes through the upper portion of a discharge opening 23 in the narrow rear portion of the body, having opposite side 24 and bottom edge portions 25 that are defined by the rear of the trough-like bottom wall.

Opposite upright side walls 26 on the main portion of the body are joined by the trough-like bottom wall 22 and similarly converge rearwardly to the rear extremity of the body, where they are joined by a rear wall 27. The rear wall has a lower edge 28 which defines the top of the discharge opening 23, and it extends upwardly and forwardly to the top of the body to reinforce the rear thereof. The rear wall 27 is preferably outwardly convexly curved, as seen best in FIGURES 1 and 2, and the upper edges of the front and side walls are also curled inwardly a short distance, as at 29, to further rigidify the body.

Figure 2:
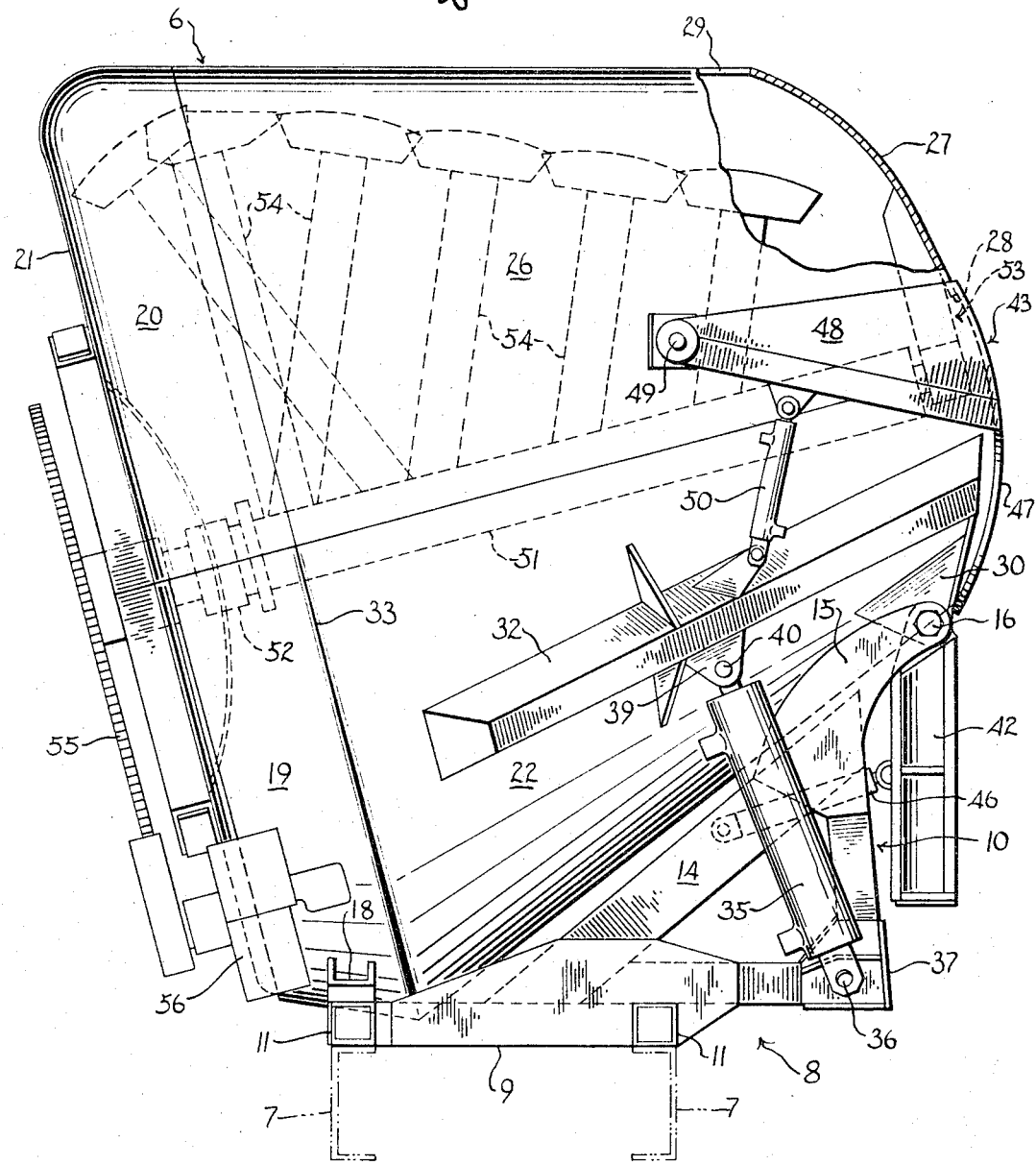
FIGURE 2 is a side view of the body showing the same in its normal or transit position.

If desired, the upper edges of the side and front walls can be straight, and also horizontal, when the body is in its normal or transit position seen in FIGURE 2. In addition, the body preferably has a length and width substantially equal to its height, so as to be capable of crossmounting on the chassis of a truck without exceeding the eight-foot vehicle width limitation set by most states.

Brackets 30 fixed to the exterior of the trough-like bottom wall 22 at locations close to but at opposite sides of the discharge opening 23 carry bearings 31 in which the pivot pins 16 are received, so as to mount the body on the subframe for tilting motion about a horizontal axis extending transversely across the rear of the body closely adjacent to the bottom edge 25 of its discharge opening.

The body is further strengthened by a pair of hollow elongated reinforcing rails 32 which are welded to opposite sides of its trough-like bottom wall near the junctions thereof with the upright side walls 26. These rails extend lengthwise upwardly and rearwardly along the exterior of the body from points just behind the junction 33 between the two conically surfaced bottom wall portions, and their rear ends are located at opposite sides of the discharge opening 23, closely adjacent to its opposite side edges 24.

Figure 3:
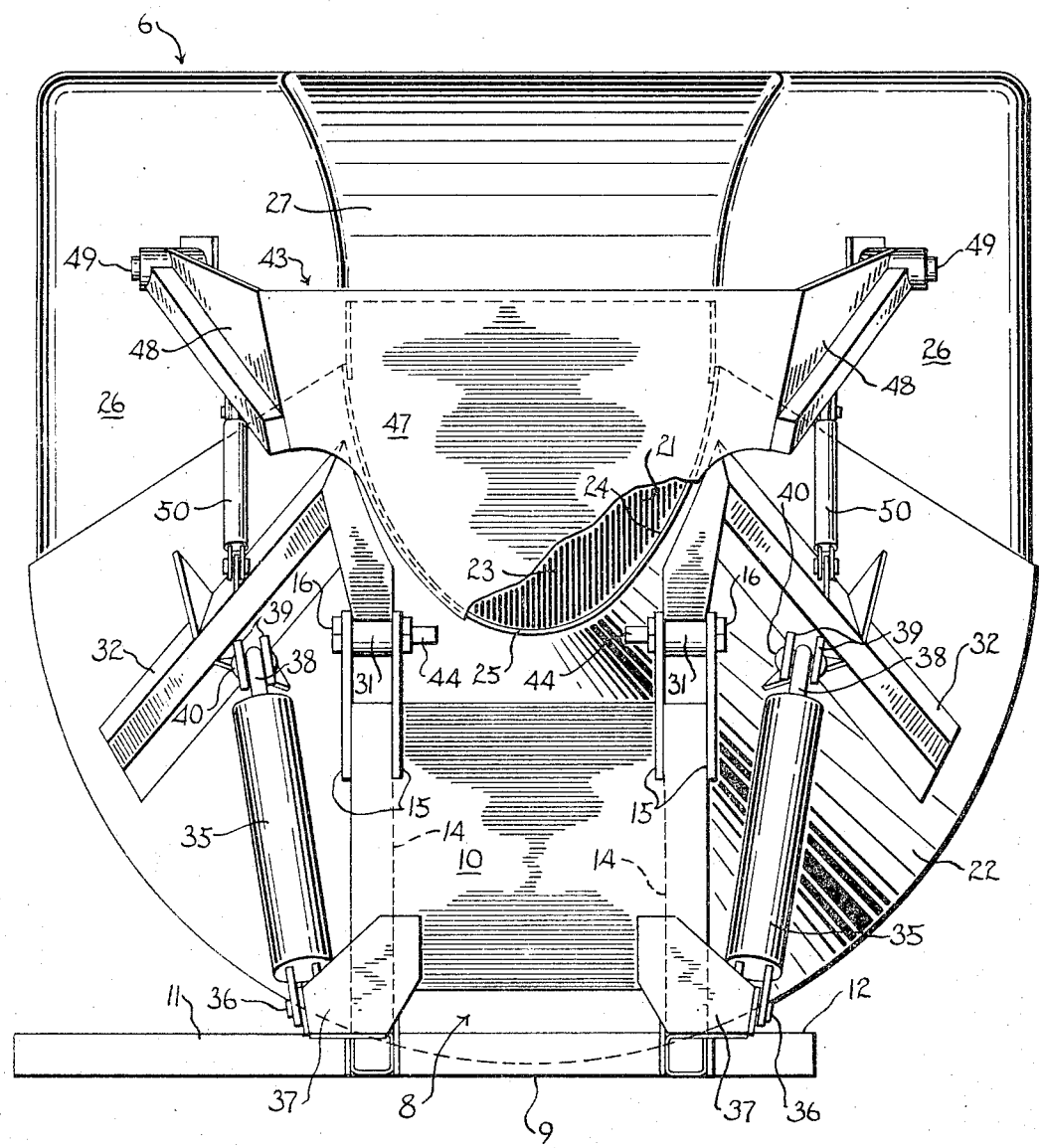
FIGURE 3 is a rear elevation of the body shown in FIGURE 2, but with its discharge chute removed.

Referring to FIGURE 3, it will be seen that the two rails 32 are spaced a wide distance apart circumferentially of the trough-like bottom wall 22, leaving a substantially unsupported major portion of its conical surface to belly downwardly between the rails so that it can be placed in tension by the weight of the body contents.

The lifting force necessary to tilt the body out of its transit position to a discharge position, such as seen in FIGURE 1, is applied to the rails 32 by means of a pair of hydraulic cylinders 35. The cylinders are located at opposite sides of the subframe 8, and are normally disposed with their axes tilted upwardly and forwardly (see FIGURE 2) and also in outwardly divergent relation as shown best in FIGURE 3. For this purpose, the lower or head end of each cylinder is supported on a pivot pin 36 which is received in a ball bushing (not shown) carried by an outboard bearing bracket 37 affixed to the adjacent side of the subframe at the bottom of the standard 10 thereon. The piston rod 38 of each cylinder projects upwardly toward the underside of its adjacent rail 32 to be received between spaced lugs 39 fixed thereon medially of its ends. A pivot pin 40 passing through the eye of the piston rod and received in ball bushings (not shown) in the lugs connects the work performing element of each cylinder with the rail thereabove. The ball bushings, of course, provide for swiveling motion of the pivot pins 36 and 40 as the piston rods 38 are extended and retracted.

With the cylinders 35 operatively connected between the subframe and the body as described, it will be noted by reference to FIGURE 2 that their bottom pivot pins 36 lie in a transversely extending vertical plane which is substantially equidistant from the body tilt pins 16 and the rod pins 40, with the latter located approximately 15° forwardly from said plane and at nearly the same level as the body tilt pins. Hence, as the body tilts during extension of the piston rods in the cylinders 35, the rod pivots travel upwardly and rearwardly about the axis of the body tilt pins 16 toward the vertical transverse plane passing through the cylinder head pins 36, to positions either in said plane or very close to it in the full discharge position of the body. In this full discharge position, therefore, the axes of the cylinders 35 are thus substantially coincident with said vertical transverse plane, and it will be seen that the cylinders are disposed in the most favorable attitudes for the work they must perform.

The dump body of this invention also features a chute 42 to facilitate distribution of material discharging through the opening 23, and a gate 43 for closing said opening and for controlling the discharge of material therethrough.

The chute 42 is pivotally supported upon inward extensions 44 of the body pivot pins 16 by means of arms 45 on the inner end of the chute. It can swing out of an inoperative transit position at which it extends straight down along the outer side of the standard 10, to an operative position such as seen in FIGURE 1 beneath the discharge opening 23, to conduct material discharging therefrom downwardly and rearwardly away from the rear of the body.

The chute is also power operated by means of a hydraulic cylinder 46 connected between the subframe 8 and the bottom of the chute as seen best in FIGURE 2.

While the chute is substantially short, it is of the type to which an additional longer chute section can be connected to form an extension thereof long enough to enable concrete to be discharged onto a roadbed alongside which the truck is driven.

The gate 43 has a wall 47 with a cylindrical surface the axis of which transversely intersects the axis of the conically surfaced bottom wall portions of the body. The side and bottom edges 24 and 25 of the discharge opening 23 are similarly curved and concentric to the axis of the cylindrical surface on the gate from the bottom edge of the opening to the top edge 28 thereof. Thus, the cylindrically surfaced wall 47 on the gate can intimately engage the side and bottom edges of the discharge opening in the closed position of the gate seen in FIGURE 2, which shows that the gate also seats upon a lower marginal portion of the rear wall 27 to most effectively close the opening.

Opposite arms 48 on the gate extend divergently forwardly along the opposite side walls 26 of the body and have their forward ends mounted on studs 49 fixed on and projecting outwardly from the body sides. The axis of the studs 49 is parallel to the body tilt axis and is located a distance directly above the axis of the cylindrically surfaced wall 47 on the gate so as to be closer to all portions of the rear wall 27 than to any side or bottom edge portion of the discharge opening. Because of this mounting for the gate, its cylindrical wall 47 moves upwardly and outwardly away from the rear of the body during opening of the gate.

Hydraulic cylinders 50 are operatively connected between the arms 48 on the gate and the reinforcing rails 32 therebeneath, to provide for power actuation of the gate between open and closed positions.

If desired, the body can be provided with agitating means comprising a shaft 51 extending lengthwise fore and aft in the interior of the body with its axis coincident with that of the conically surfaced bottom wall portions of the body. The shaft 51 is supported for rotation by means of a bearing structure 52 on the inside of the front wall 21, and a hanger 53 carried by the rear wall 27. A number of agitator arms 54 having paddles 54 on their outer ends are secured to the shaft at spaced locations along its length to agitate the body contents in consequence of rotation of the shaft in one direction and to propel the body contents rearwardly toward the discharge opening in consequence of rotation of the shaft in the opposite direction.

Though the arms 54 have been shown for convenience of illustration as all extending upwardly from the shaft, it will be understood by reference to my Patent No. 3,281,126, issued Oct. 25, 1966, that the arms radiate from the shaft at different angles to one another so as to minimize the number of paddles that pass through the body contents at any given instant.

A large diameter gear 55 on a projecting forward end portion of the shaft provides for rotating the shaft from power means 56 mounted on the exterior of the front section of the body.

From the foregoing description, together with the accompanying drawings, it will be apparent to those skilled in the art that this invention provides an improved tilt body for dump trucks, which body can be readily mounted by means of a compact subframe that forms a unitary assembly with the body, either lengthwise or crosswise on a truck chassis for side or end discharge of its contents, and wherein the body is of such size and shape and so reinforced that it can be constructed from relatively lightweight sheet metal.

What is claimed as my invention is:

1. A dump body having an open top, an upright front wall, a rearwardly facing discharge opening in its rear, and bearing means disposed on a transverse tilt axis adjacent to the bottom edge of the discharge opening, by which the body can be supported for tilting motion to a discharge position, wherein the improvement comprises:
   (A) an outwardly convex bottom which has a substantially semicircular cross section and which converges upwardly and rearwardly at decreasing diameter to the discharge opening to define the bottom and side edges thereof;
   (B) opposite side walls connected to and rising from the opposite sides of the bottom wall and similarly converging rearwardly to the rear of the body;
   (C) opposite elongated rearwardly converging reinforcing rails on the body extending fore and aft along its exterior and widely spaced apart so as to be closely adjacent to the junction between the body side and bottom walls, said rails being independent of one another and each having means thereon to directly receive the thrust of power actuated lift mechanism by which the body can be swung about said tilt axis to a discharging position;
   (D) and the major portion of said bottom wall rearwardly of the front wall bellying downwardly in trough-like fashion between the reinforcing rails and being unsupported except by said rails so as to be placed in tension circumferentially therebetween when the weight of the body and its contents is borne by the rails.

2. The dump body of claim 1, wherein said rails have downwardly facing surfaces, and said thrust receiving means on the rails comprise lugs which are spaced a distance forwardly from but located close to the level of the body tilt axis and on said downwardly facing surfaces.

3. The dump body of claim 1, further characterized by brace means joining the side walls at the rear of the body to reinforce the same, said brace means comprising a fixed rear wall on the body providing the upper edge of the discharge opening and extending upwardly and forwardly therefrom to the top of the body to lend rigidity thereto, said rear wall being disposed entirely forwardly of a plane passing through the upper and lower edges of the discharge opening.

4. The dump body of claim 3 wherein said rear wall is outwardly convex and curves upwardly and forwardly to the top of the body.

5. The dump body of claim 3, further characterized by:
   (A) a gate normally closing the discharge opening;
   (B) opposite arms on the gate overlying the opposite sides of the body above said rails and mounting the gate on the body for upward swinging motion out of its closed position and over said rear wall, about a transverse axis spaced forwardly from the upper edge of the discharge opening;
   (C) and power operated gate actuating means at opposite sides of the body, extending between and connected to the gate arms and to portions of said rails therebeneath.

6. A dump body unit comprising a body and a subframe on which the body is supported for tilting motion out of a normal position to a discharge position at which its front end is elevated to promote flow of the body contents through a discharge opening in the rear of the body, characterized by:
   (A) the subframe having
      (1) a substantially horizontal base which is adapted for securement to a truck chassis, and which has opposite sides, and front and rear portions respectively under the front and rear portions of the body,
      (2) a standard which projects upwardly from the rear portion of the base toward the bottom of the body at the rear thereof,
      (3) and bearing means for the body carried by the standard at the top thereof, supporting the body for pivotal motion about a tilt axis extending transversely across the rear of the body closely adjacent to the lower edge of said discharge opening;
   (B) the body being open at its top and having
      (1) a rounded substantially conically surfaced bottom which converges upwardly and rearwardly to terminate at and to define the opposite side and bottom edges of the discharge opening,
      (2) upright, substantially flat rearwardly convergent side walls the lower portions of which are joined by said conically surfaced bottom,
      (3) a substantially upright front wall,
      (4) and a rear wall joining the rear edges of said side walls and having a lower edge which extends across the rear of the body to define the top edge of the discharging opening, said rear wall extending upwardly and forwardly from the discharge opening and joining upper portions of the side walls at the rear of the body to rigidify the body at its rear;
   (C) and a pair of hydraulic cylinders to provide for up and down tilting of the body, said cylinders having upper ends connected to the body at widely spaced apart opposite side portions thereof and having lower portions connected to the base at locations externally adjacent to the bottom of the standard, and said cylinders rising from the base at opposite sides of the standard.

7. The dump body unit of claim 6, further characterized by:
   (A) opposite reinforcing rails on the exterior of the body extending lengthwise fore and aft along the conically surfaced bottom thereof at locations spaced slightly below the lower portions of the body side walls;
   (B) and wherein said cylinders connect with said rails at locations intermediate their ends and near the level of the body tilt axis.

8. A dump body unit comprising a body and a subframe on which the body is supported for tilting motion out of a normal position to a discharge position at which its front end is elevated to promote flow of the body contents through a discharge opening in the rear of the body, characterized by:
   (A) the subframe having
      (1) a substantially horizontal base which is adapted for securement to a truck chassis, and which has opposite sides and front and rear portions centered under the body, the rear of said base being substantially equal in width to that of the discharge opening and having lateral extensions thereon,
      (2) a standard which projects upwardly from a rear portion of the base adjacent to said lateral extensions thereof,
      (3) and bearing means for the body carried by the standard at the top thereof, supporting the body for pivotal motion about a tilt axis extending transversely across the rear of the body closely adjacent to the lower edge of the discharge opening;

(B) the body having a fore and aft dimension which is substantially equal to the width thereof at its front portion, and being open at its top and having
(1) a rounded substantially conically surfaced bottom which converges upwardly and rearwardly to terminate at and to define the opposite side and bottom edges of the discharge opening,
(2) upright, substantially flat rearwardly convergent side walls the lower portions of which are joined by said conically surfaced bottom,
(3) a substantially upright front wall,
(4) a rear wall joining the rear edges of the side walls and having a lower edge which extends across the rear of the body to define the top edge of the discharge opening, said rear wall extending upwardly and forwardly from the discharge opening and joining upper portions of the side walls at the rear of the body to rigidify the body at its rear;
(5) and opposite reinforcing rails on its exterior extending lengthwise fore and aft along the conically surfaced bottom thereof at locations spaced slightly below the lower portions of the body side walls;
(C) and power actuated means providing for up and down tilting of the body, comprising a pair of hydraulic cylinders having lower ends connected to said lateral extensions on the base and having extensible and retractible elements connected to said rails at locations intermediate their ends and near the level of the body tilt axis, said cylinders being located laterally outwardly of the subframe and disposed with their axes in upwardly divergent relation to one another and inclined forwardly away from the body tilt axis.

9. A dump body having an open top, an upright front wall, a rearwardly facing discharge opening in its rear, and bearing means disposed on a transverse tilt axis adjacent to the bottom edge of the discharge opening, by which the body can be supported for upward tilting motion of its front portion to facilitate discharge of its contents through said discharge opening, said body further having:
(A) an outwardly convex bottom wall of substantially semi-circular cross section and which converges upwardly and rearwardly from a large radius front portion to a small radius rear portion where said bottom wall defines the bottom and side edges of the discharge opening;
(B) opposite side walls joined to and rising from the opposite sides of the bottom wall and similarly converging toward the rear of the body;
(C) a rear wall extending downwardly and rearwardly from the top of the body to said discharge opening to define the top thereof;
(D) a gate pivotally carried by the body for swinging movement to and from a position closing the discharge opening—
(E) and the body walls being so arranged that
(1) the large radius front portion of the body is at least twice as wide as said small radius rear portion thereof and approximately equal to the fore and aft dimension of the body,
(2) the side walls extend to a level a substantial distance above the top of the discharge opening,
(3) and the bottom edge of the discharge opening lies in a horizontal plane spaced at least as far from the top of the body as from the lowest front portion thereof.

10. A dump body unit comprising a body and a subframe supporting the body for tilting motion out of a normal position to a discharge position at which its front end is elevated to promote flow of the body contents through a rearwardly facing discharge opening in the rear of the body, characterized by:
(A) the body being open at its top and having
(1) rearwardly convergent side walls,
(2) a trough-like bottom wall that converges upwardly and rearwardly to the discharge opening to define the bottom and side edges thereof,
(3) an upright front wall,
(4) and a rear wall above said discharge opening;
(B) a gate pivotally carried by the body for movement to and from a position closing said discharge opening;
(1) a base beneath the body,
(2) a standard rising from the base at a location near to but forwardly of the rear extremity of the body so as to define a space directly below the rear end portion thereof;
(3) laterally opposite bearing members extending rearwardly of the top of the standard toward the rear of the body,
(4) and pivot means carried by said bearing members and supporting the body for said tilting motion about a transverse axis at a level closely adjacent to the bottom edge of the discharge opening, said pivot means comprising pins having free end portions projecting toward one another;
(C) and a chute member hingedly supported on the free end portions of said pins for rearward and upward swinging motion out of a transit position at which the chute extends substantially vertically downwardly in said space beneath the rear end portion of the body.

11. The dump body unit of claim 10, further characterized by:
(A) said subframe having brace means forwardly of the standard;
(B) and a hydraulic cylinder connected between said brace means and the chute member to provide for swinging the chute member about said pivot means.

References Cited

UNITED STATES PATENTS

| | | | |
|---|---|---|---|
| 2,857,669 | 10/1958 | Hain. | |
| 1,821,056 | 9/1931 | Durham | 296—56 |
| 2,658,795 | 11/1953 | Nicholson | 298—7 |
| 2,880,977 | 4/1959 | Maxon | 298—7 X |
| 2,963,185 | 12/1960 | Jones. | |
| 3,180,628 | 4/1965 | Pullin | 259—171 X |
| 3,236,562 | 2/1966 | Maxon | 298—18 X |
| 3,198,495 | 8/1965 | Maxon | 298—7 X |

RICHARD J. JOHNSON, *Primary Examiner.*

U.S. Cl. X.R.

298—22, 23, 18; 259—171